(12) United States Patent
Smullin et al.

(10) Patent No.: US 9,064,417 B2
(45) Date of Patent: Jun. 23, 2015

(54) COMPUTER-IMPLEMENTED SYSTEM AND METHOD FOR DIRECTING USERS TO AVAILABLE PARKING SPACES

(71) Applicant: Palo Alto Research Center Incorporated, Palo Alto, CA (US)

(72) Inventors: Sylvia Smullin, Menlo Park, CA (US); Robert T. Krivacic, San Jose, CA (US)

(73) Assignee: Palo Alto Research Center Incorporated, Palo Alto, CA (US)

( * ) Notice: Subject to any disclaimer, the term of this patent is extended or adjusted under 35 U.S.C. 154(b) by 40 days.

(21) Appl. No.: 13/725,642

(22) Filed: Dec. 21, 2012

(65) Prior Publication Data

US 2014/0176349 A1 Jun. 26, 2014

(51) Int. Cl.
*B60Q 1/48* (2006.01)
*G08G 1/14* (2006.01)
*G01C 21/36* (2006.01)

(52) U.S. Cl.
CPC ............. *G08G 1/142* (2013.01); *G08G 1/147* (2013.01); *G01C 21/3685* (2013.01)

(58) Field of Classification Search
USPC .......... 340/993, 994, 995.1–995.28; 701/426; 705/5, 13, 22
See application file for complete search history.

(56) References Cited

U.S. PATENT DOCUMENTS

| | | | |
|---|---|---|---|
| 3,349,368 A * | 10/1967 | Kates | 340/913 |
| 4,310,890 A | 1/1982 | Trehn et al. | |
| 4,356,903 A | 11/1982 | Lemelson et al. | |
| 4,532,418 A | 7/1985 | Meese et al. | |
| 5,266,947 A | 11/1993 | Fujiwara et al. | |
| 5,432,509 A | 7/1995 | Kajiwara | |
| 5,570,771 A | 11/1996 | Jacobs | |
| 5,710,557 A | 1/1998 | Schuette | |
| 5,710,743 A | 1/1998 | Dee et al. | |
| 5,740,050 A | 4/1998 | Ward, II | |
| 5,770,845 A | 6/1998 | Hjelmvik | |
| 5,777,951 A | 7/1998 | Mitschele | |
| 5,841,369 A | 11/1998 | Sutton et al. | |
| 5,910,782 A * | 6/1999 | Schmitt et al. | 340/995.12 |
| 6,078,272 A | 6/2000 | Jacobs et al. | |
| 6,081,205 A | 6/2000 | Williams | |
| 6,081,206 A | 6/2000 | Kielland | |
| 6,102,285 A | 8/2000 | Elias | |
| 6,111,522 A | 8/2000 | Hiltz et al. | |
| 6,188,328 B1 | 2/2001 | Ho | |
| 6,243,028 B1 | 6/2001 | Krygler et al. | |

(Continued)

FOREIGN PATENT DOCUMENTS

| | | | |
|---|---|---|---|
| CH | 703468 | 1/2012 | |
| JP | 04335697 A * | 11/1992 | ............... G09G 5/00 |

(Continued)

*Primary Examiner* — Paul Obiniyi
(74) *Attorney, Agent, or Firm* — Patrick J. S. Inouye; Krista A. Wittman

(57) ABSTRACT

A computer-implemented system and method for directing motorists to available parking spaces. Availability of a plurality of parking spaces is determined. A street location of a dynamic parking sign comprising identifiers is determined. A direction of each of the available parking spaces from the street location is determined and the available parking spaces are grouped by direction. Parking factors are applied to the grouped available parking spaces and at least one of the groups of parking spaces that satisfy the parking factors is selected. The direction of the selected groups of parking spaces is displayed on a dynamic street sign.

24 Claims, 12 Drawing Sheets

(56) References Cited

U.S. PATENT DOCUMENTS

| | | |
|---|---|---|
| 6,243,029 B1 | 6/2001 | Tomer |
| 6,275,169 B1 | 8/2001 | Krygler et al. |
| 6,373,401 B2 | 4/2002 | Ho |
| 6,437,692 B1 | 8/2002 | Petite et al. |
| 6,459,386 B1 | 10/2002 | Jones |
| 6,493,676 B1 | 12/2002 | Levy |
| 6,505,774 B1 | 1/2003 | Fulcher et al. |
| 6,513,711 B1 | 2/2003 | Hjelmvik |
| 6,519,329 B1 | 2/2003 | Hjelmvik |
| 6,577,248 B1 | 6/2003 | Hjelmvik |
| 6,791,473 B2 | 9/2004 | Kibria et al. |
| RE38,626 E | 10/2004 | Kielland |
| 6,812,857 B1 | 11/2004 | Kassab et al. |
| 6,816,085 B1 * | 11/2004 | Haynes et al. ............. 340/932.2 |
| 6,823,317 B1 | 11/2004 | Ouimet et al. |
| 6,885,311 B2 * | 4/2005 | Howard et al. ............ 340/932.2 |
| 6,927,700 B1 | 8/2005 | Quinn |
| 6,929,179 B2 | 8/2005 | Fulcher et al. |
| 6,970,101 B1 * | 11/2005 | Squire et al. .............. 340/932.2 |
| 7,002,487 B1 | 2/2006 | Montgomery, Sr. |
| 7,014,355 B2 | 3/2006 | Potter, Sr. et al. |
| 7,019,670 B2 | 3/2006 | Bahar |
| 7,123,166 B1 | 10/2006 | Haynes et al. |
| 7,237,716 B2 | 7/2007 | Silberberg |
| 7,277,010 B2 | 10/2007 | Joao |
| RE40,013 E | 1/2008 | Quinn |
| 7,321,317 B2 | 1/2008 | Nath et al. |
| 7,382,244 B1 | 6/2008 | Donovan et al. |
| 7,393,134 B2 | 7/2008 | Mitschele |
| 7,474,589 B2 | 1/2009 | Showen et al. |
| 7,579,964 B2 | 8/2009 | Nath et al. |
| 7,652,593 B1 | 1/2010 | Haynes et al. |
| 7,667,619 B2 | 2/2010 | Montgomery, Sr. |
| 7,688,225 B1 | 3/2010 | Haynes et al. |
| 7,768,426 B2 | 8/2010 | Groft |
| 7,791,501 B2 | 9/2010 | Ioli |
| 7,791,503 B2 | 9/2010 | Breed et al. |
| 7,805,239 B2 * | 9/2010 | Kaplan et al. ................ 701/426 |
| 7,839,302 B2 * | 11/2010 | Staniszewski ............ 340/932.2 |
| 7,855,935 B1 | 12/2010 | Lauder et al. |
| 7,900,966 B1 | 3/2011 | Stennett |
| 8,111,172 B2 * | 2/2012 | Morimoto et al. ......... 340/932.2 |
| 8,175,803 B2 * | 5/2012 | Caraballo ..................... 701/426 |
| 8,600,800 B2 * | 12/2013 | Rowe et al. ..................... 705/13 |
| 8,620,768 B1 * | 12/2013 | Lopez et al. .................. 705/26.1 |
| 8,688,509 B2 * | 4/2014 | Rowe et al. ..................... 705/13 |
| 2002/0077953 A1 | 6/2002 | Dutta |
| 2004/0068433 A1 | 4/2004 | Chatterjee et al. |
| 2004/0254840 A1 * | 12/2004 | Slemmer et al. ............... 705/22 |
| 2005/0280555 A1 * | 12/2005 | Warner ..................... 340/932.2 |
| 2009/0125341 A1 * | 5/2009 | Somoza et al. .................. 705/5 |
| 2009/0150073 A1 * | 6/2009 | Caraballo .................... 701/210 |
| 2009/0167565 A1 * | 7/2009 | Morimoto et al. ......... 340/932.2 |
| 2009/0171567 A1 * | 7/2009 | Morimoto et al. ............ 701/204 |
| 2009/0276236 A1 | 11/2009 | Adamczyk et al. |
| 2009/0309760 A1 * | 12/2009 | Chew ........................ 340/932.2 |
| 2010/0030708 A1 * | 2/2010 | Ward, II ........................ 705/418 |
| 2010/0042318 A1 * | 2/2010 | Kaplan et al. ................. 701/204 |
| 2010/0106514 A1 | 4/2010 | Cox |
| 2011/0035261 A1 | 2/2011 | Handler |
| 2011/0093352 A1 * | 4/2011 | Sarmiento et al. ............ 705/26.1 |
| 2011/0127944 A1 * | 6/2011 | Saito et al. ..................... 320/101 |
| 2011/0131083 A1 | 6/2011 | Redmann et al. |
| 2011/0140658 A1 | 6/2011 | Outwater et al. |
| 2011/0181441 A1 * | 7/2011 | Ma et al. ..................... 340/932.2 |
| 2011/0193522 A1 | 8/2011 | Uesugi |
| 2011/0227533 A1 | 9/2011 | Wolfien |
| 2011/0241619 A1 | 10/2011 | Young et al. |
| 2011/0246252 A1 | 10/2011 | Uesugi |
| 2011/0270669 A1 * | 11/2011 | Rowe et al. ................. 705/14.37 |
| 2012/0044091 A1 * | 2/2012 | Kim et al. .................. 340/932.2 |
| 2012/0062394 A1 * | 3/2012 | Pampus et al. ............. 340/932.2 |
| 2012/0095791 A1 * | 4/2012 | Stefik et al. ........................ 705/5 |
| 2012/0095792 A1 * | 4/2012 | Stefik et al. ........................ 705/5 |
| 2012/0112698 A1 | 5/2012 | Yoshimura et al. |
| 2012/0173292 A1 | 7/2012 | Solomon et al. |
| 2012/0200430 A1 | 8/2012 | Spahl |
| 2012/0245981 A1 * | 9/2012 | Volz ................................ 705/13 |
| 2012/0323643 A1 * | 12/2012 | Volz ................................ 705/13 |
| 2012/0326893 A1 * | 12/2012 | Glezerman ................ 340/932.2 |
| 2013/0076296 A1 * | 3/2013 | Ushiroda ...................... 320/101 |
| 2013/0166530 A1 * | 6/2013 | Pilat et al. ...................... 707/708 |

FOREIGN PATENT DOCUMENTS

| | | | |
|---|---|---|---|
| JP | 08022598 A * | 1/1996 | ............. G08G 1/14 |
| WO | 0046068 | 8/2000 | |
| WO | 2006086831 | 8/2006 | |

* cited by examiner

COMPUTER-IMPLEMENTED SYSTEM AND METHOD FOR DIRECTING USERS TO AVAILABLE PARKING SPACES

FIELD

This application relates in general to motor vehicle parking and, in particular, to a computer-implemented system and method for directing users to available parking locations.

BACKGROUND

Public roads primarily facilitate traffic. Parking is offered as a secondary benefit incident to vehicle throughway. Local governments typically regulate parking on public roads, whether at curbside, in municipal lots, or on other public property, through a regulatory scheme that promotes public safety and provides revenue generation. The impact of regulated control over on-street parking affects all motorists, as well as urban residents, local businesses, commercial drivers, and other parties that use or rely upon on-street parking. Drivers who need to park their vehicle are directly impacted by regulated parking control. For example, looking for a parking space wastes time and fuel, contributes to traffic congestion, creates frustration and stress, and increases pollution, while disregarding parking regulations can result in parking tickets, fines, or towing. Despite these downsides, parking regulation remains a practical necessity.

Commonly, public parking is controlled through parking regulations and prohibitions that permit parking on a first-come, first-served basis, with few exceptions, such as allowed by special permit. However, allowing users to locate on-street parking on a first-come, first-served basis can create congestion on the streets as drivers slow down to look for available parking, wait for parked cars to leave a parking spot, and stop to read parking restrictions posted on signs associated with some on-street parking spots. Further congestion is experienced as parking garages or parking lots become full and drivers are forced to look for empty on-street spaces or wait for an empty space in the lot or garage. Users can become frustrated looking for an available parking space and may be discouraged from visiting areas in which parking is difficult to locate.

There is a need for more efficiently directing users to available on-street parking spots to reduce congestion on the streets and to improve the experience of drivers wishing to park.

SUMMARY

A computer-implemented system and method for directing motorists to available parking spaces is provided. Availability of a plurality of parking spaces is determined. A street location of a dynamic parking sign comprising identifiers is determined. A direction of each of the available parking spaces from the street location is determined and the available parking spaces are grouped by direction. Parking factors are applied to the grouped available parking spaces and at least one of the groups of parking spaces that satisfy the parking factors is selected. The direction of the selected groups of parking spaces is displayed on a dynamic street sign.

Still other embodiments of the present invention will become readily apparent to those skilled in the art from the following detailed description, wherein is described embodiments of the invention by way of illustrating the best mode contemplated for carrying out the invention. As will be realized, the invention is capable of other and different embodiments and its several details are capable of modifications in various obvious respects, all without departing from the spirit and the scope of the present invention. Accordingly, the drawings and detailed description are to be regarded as illustrative in nature and not as restrictive.

DETAILED DESCRIPTION

In areas that are overpopulated or that have minimal parking, locating available parking, such as in a lot or garage, or on-street parking can be difficult. Motorists, urban residents, commercial drivers, out-of-town visitors, and other parties that use or rely upon public parking often drive around looking for available parking until a space is found or until that individual gives up. Drivers can become easily frustrated looking for an available parking space, while creating congestion and pollution by aimlessly driving around looking for an available parking space. If a driver becomes too frustrated, he may be discouraged from later visiting areas where parking is difficult to locate. Directing users to available parking spots can assist in alleviating congestion, pollution, and frustration.

Figure 1:
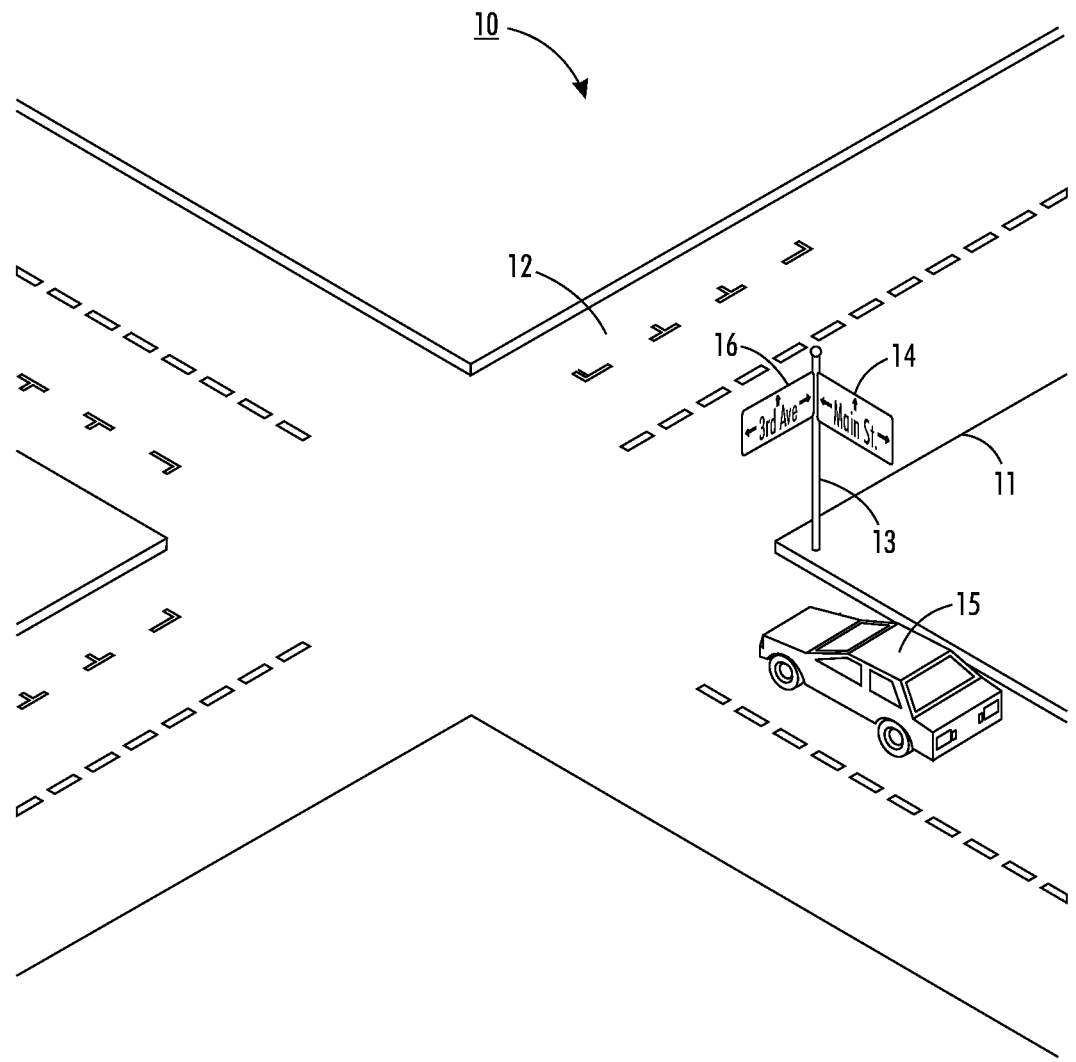
FIG. 1 is a functional block diagram showing a computer-implemented system for directing users to available on-street parking spaces, in accordance with one embodiment.

Drivers can be directed to available parking spaces via a dynamic street sign. FIG. 1 is a functional block diagram 10 showing a computer-implemented system 10 for directing users to available on-street parking spaces 12, in accordance with one embodiment. Parking spaces 12 are located along one or more streets 11. Additionally, the parking spaces can include parking in a pool, which includes a plurality of parking spaces that can be physically adjacent to each other or disbursed, parking in a parking lot, or parking in a parking garage. The parking spaces within a pool, lot, or garage may be managed as a group, rather than individually for each space. For example, a pool may have 20 spaces, 15 of which are occupied and 5 of which remain available. In a pool, all of the spots are managed as if they are interchangeable and so a driver can choose any one of the available spots. Hereinafter, the term "parking space" is intended to include individually-managed parking spaces, and parking spaces that are part of a pool, lot, or garage, unless otherwise indicated.

A parking space is determined to be occupied, at a particular time, when a vehicle is located within the space or when a motorist or driver reserves one of the parking spaces in advance for the given time or on-site as a form of "instant" parking reservation, according to U.S. patent application Ser. No. 13/624,876, filed on Sep. 21, 2012. Additionally, one or more of the parking spaces can include capabilities for charging plug-in hybrid and electric vehicles and can be utilized by motorists needing a charge. The charging capabilities can be provided for dual use with parking, such as according to U.S. patent application Ser. No. 13/624,883, filed on Sep. 21, 2012.

The parking spaces 12 are each monitored to determine availability on an ongoing basis. Availability can be determined based solely on a determination regarding whether each parking space is occupied or with consideration to other factors, such as reservations and parking regulations. Occupancy of an on-street parking space can be determined via inductive loop sensors, camera, data collected and transmitted from parking meters regarding parking spaces that have been paid, as well as other sensors. Once occupancy is determined, parking availability can be determined by location. Availability of parking spaces 12 can be managed individually or as a pool of two or more spaces 12. For example, a motorist checks-in to a parking pool of parking spaces and vehicle occupancy sensors identify when the vehicle 15 leaves from the parking space 12 within the parking pool. In a further embodiment, a motorist checks-in to a particular parking space 12 when parking and vehicle occupancy sensors identify when the vehicle 15 leaves the parking space 12. Determining occupancy and availability of on-street parking spaces 12 is further discussed below with reference to FIGS. 5-7.

Drivers 15 can be directed to the available spaces, once determined, via a dynamic street sign 14, 16. The sign can be displayed at an intersection of two or more streets 11, such as on a lamp post or pole 13 that is affixed to a sidewalk at the intersection. The street sign can be positioned in a parallel orientation 14 parallel to the street in which the driver is located or in a perpendicular orientation 16, parallel to a street that intersects the street in which the driver is located. In a third orientation, not shown, the street sign is aligned perpendicular to the street in which the driver is located, but the sign is not parallel to a street that intersects the street on which the driver is located at an angle different from 90 degrees. In one embodiment, the street sign can include parking availability, such as by an arrow pointing in a direction of the available parking. In further embodiments, the sign can also include one or more of a street name, as well as one or more of a block number, cross street name, cross street block number, a number of available on-street parking spaces, a length of time for which parking is allowed in the available parking spaces, an indication as to the distance from the sign to the available parking spaces, and an indication as to a cost of the available parking spaces. The street signs can be powered via solar power or other power source, such as electrical power, and can be a light-emitting diode display. The dynamic street signs are further discussed below with reference to FIGS. 10-13.

Figure 2:
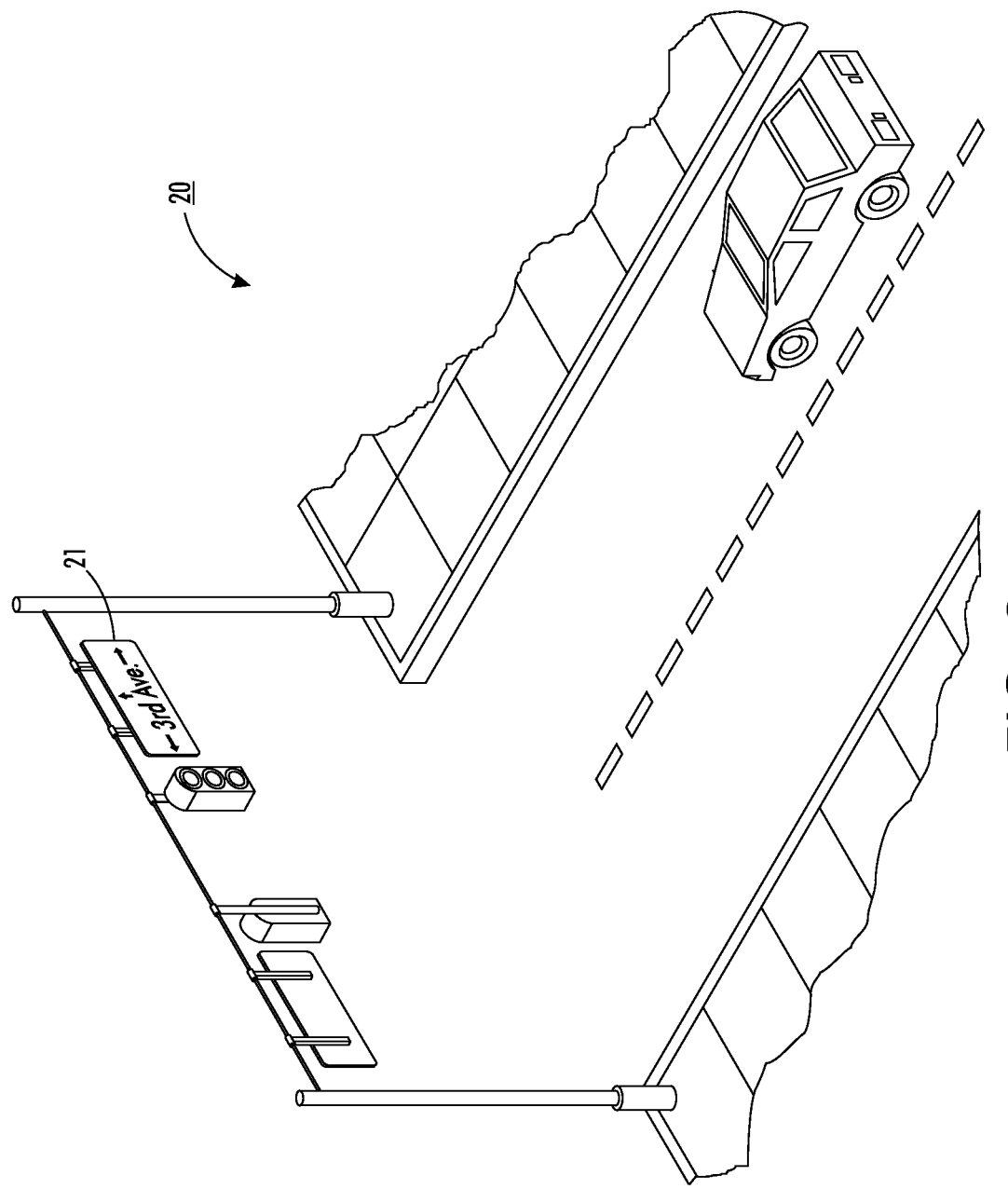
FIG. 2 is a functional block diagram showing, by way of example, an alternative computer-implemented system for directing users to available on-street parking spaces.

Alternatively, the dynamic street signs can be displayed over the street. FIG. 2 is a functional block diagram showing, by way of example, an alternative computer-implemented system 20 for directing users to available on-street parking spaces. Dynamic street signs 21 can be displayed over an intersection, such as on the same wiring that holds traffic lights for the intersection. The signs can be powered via the wires for the traffic lights or via solar power, as well as other power sources. Other placements of the dynamic street signs are possible, such as at a location along a street or prior to an intersection, rather than at the intersection.

Figure 3:
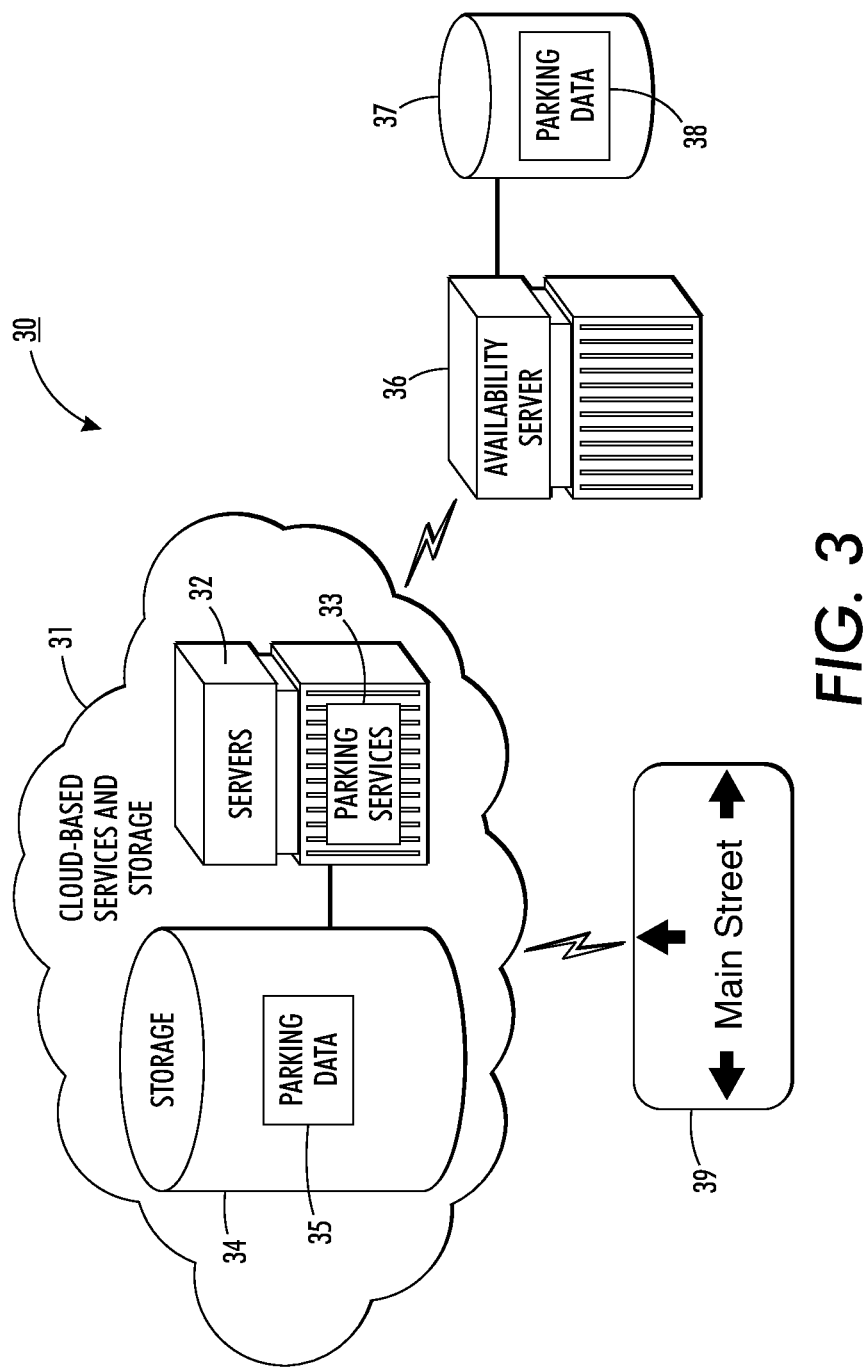
FIG. 3 is a functional block diagram showing the components of the system of FIGS. 1 and 2.

Each dynamic street sign can include a street identifier and on-street parking availability, as well as one or more parking characteristics. Parking availability can be determined via a centrally-managed hub from which a range of different types of components provide vehicle occupancy inputs and user outputs for displaying parking status. FIG. 3 is a functional block diagram showing the components of the system of FIGS. 1 and 2. Parking services 33 can identify whether motorists or vehicles are arriving, occupying or departing a parking space, which enables the parking services 33 to account for changes in occupancy of that space. The parking services can also determine whether reservations are fulfilled, pending, or being scheduled for one or more parking spaces.

The parking services 33 are provided through centrally-operated parking servers 32. The parking services 33 are server-based and implemented on the parking servers 32, which may be provided through cloud-based services 31 or by dedicated servers (not shown). Similarly, storage of parking and payment data may also be provided through cloud-based storage 34 or by dedicated storage (not shown). The parking servers 32 can also communicate with governmental transportation department officials or their equivalent for setting parking policies, enforcing parking regulations, prohibitions and, if applicable, local restrictions and monitoring system performance. In addition, the parking servers 32 may communicate with private and commercial drivers, city residents, merchants, parking enforcement officers, and other stakeholders for the various types of parking services provided.

The parking servers 32 maintain lists or databases of parking data, which may be changed by the parking services 33 as needed. At least a portion of the parking data can be obtained from an availability server, which stores the parking data in a database interconnected to the availability server. The parking data can include information, such as occupied parking spaces and unoccupied spaces. As described below with reference to FIGS. 5-7, availability can be determined solely by occupancy or by a combination of occupancy and other factors. In a further embodiment, the parking data can include a set of parking regulations, parking space occupancy data indicating which parking spaces are currently occupied by a vehicle, a list or database of the interchangeable parking spaces each of the parking pools, and a set of parking reservations for parking at future times.

Once obtained, the parking data 35 stored by the parking servers 32 can be used to determine those available spaces to which directions will be provided on the dynamic street sign 39. Once determined, the dynamic street signs can display the on-street parking space availability, as well as other information helpful for drivers to locate the available spaces, such as a direction and available time for those spaces.

In a further embodiment, users can communicate with and provide payment to the parking services 33 through various types of devices, depending upon the location of the user, the context of the communications and, if applicable, form of payment. To identify available parking spaces, request parking spaces, or interact with parking services 33, users can access the parking servers 32 through, for instance, a personal or tablet computer using a Web browser or similar application, a GPS device with a parking application, a parking application on a wireless mobile device, such as a smart phone or similar wireless-capable and Web-enabled device, and a parking meter or appliance located at curbside or near to the parking spaces, for instance, on a sidewalk. Payment in currency can be collected at curbside by the parking meter or appliance, and payment, including pre-authorizations for parking, can be collected at curbside or remotely by the parking services 33 using an electronic form of payment, such as a credit or debit card. Other types of fixed or mobile user communication devices are possible.

Figure 4:
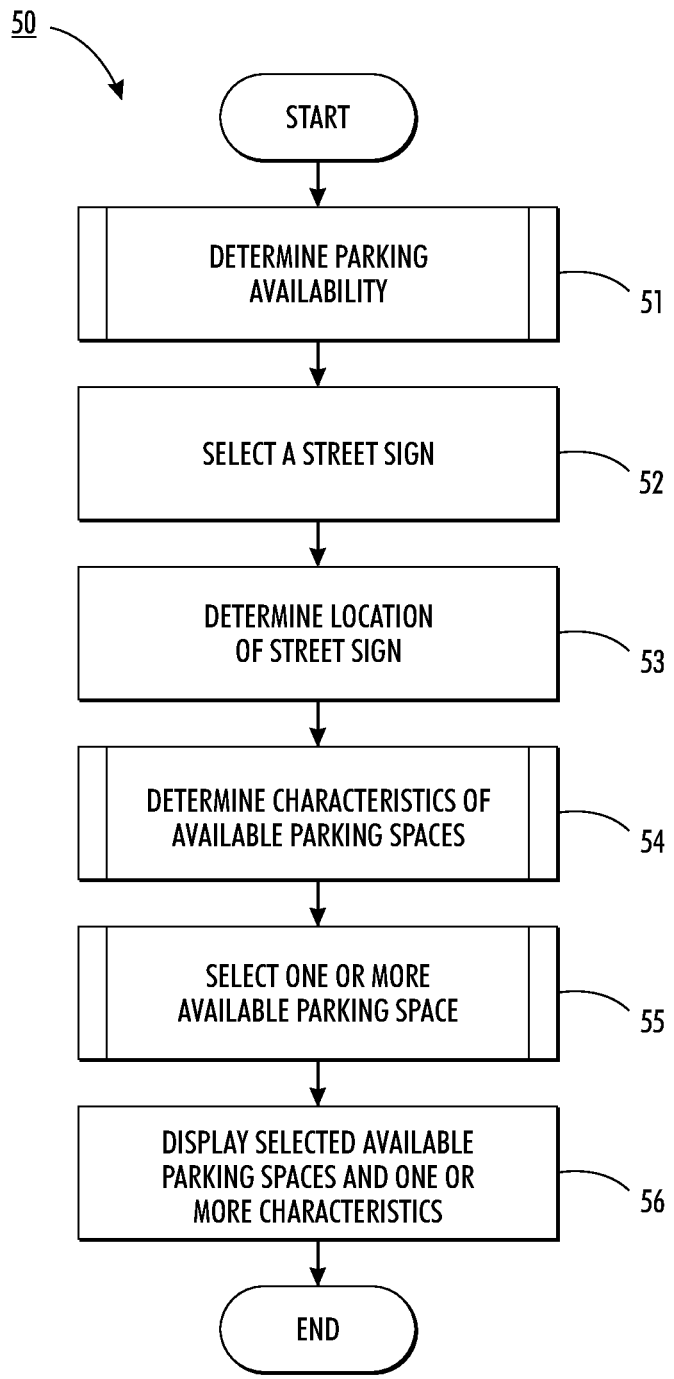
FIG. 4 is a flow diagram showing a method for directing users to available on-street parking spaces, in accordance with one embodiment.

The parking data obtained by the parking services can be used to determine available parking spaces for which direction may be displayed to a driver. FIG. 4 is a flow diagram showing a method 50 for directing users to available on-street parking spaces, in accordance with one embodiment. Availability of a plurality of on-street parking spaces is determined (block 51). The availability can be determined based solely on occupancy of a parking space or based on a combination of parking space occupancy and other availability factors, such as a parking regulations and reservations. The one or more parking spaces can be located in a common area, such as a street, neighborhoods, city, or county, as well as other locations. Determining occupancy and availability is further discussed below with reference to FIGS. 5-7. At least one dynamic street sign is selected (block 52) from a plurality of street signs in use within the area of the parking spaces. A location of the dynamic street sign is determined (block 53), characteristics are determined (block 54), and one or more of the available parking spaces are selected (block 55) for displaying on the selected dynamic street sign (block 56). The available parking spaces can be selected based on factors, including, for example, those parking spaces that are closest to the location of the dynamic street sign. Other factors are discussed below with reference to FIG. 8. Characteristics of the selected available parking spaces are determined (block 54) and one or more of the characteristics can be displayed (block 56) with the selected available parking spaces on the dynamic street sign. The dynamic street sign allows a user to identify available parking spaces to which he can directly drive without driving back and forth through the streets to locate an available space.

In one example, an individual, Sean, is driving to downtown Seattle to attend a meeting that starts at 3:00 p.m. and will last about an hour long. On-street parking can be difficult to locate downtown, but is much cheaper than parking in a garage or lot. The meeting will take place at $1^{st}$ Avenue and Main. As Sean drives along Main and approaches $3^{rd}$ Avenue and Main, he begins to look for on-street parking. A dynamic street sign is displayed in a perpendicular orientation in front of Sean, along 3rd Avenue such as in FIG. 1, at the intersection of $3^{rd}$ Avenue and Main. The sign indicates that there are available parking spaces straight ahead towards 2nd Avenue, to the left, and to the right, along Main. At the intersection, Sean drives straight, along Main, until he reaches an available parking space on the block of Main near 2nd Avenue. Once Sean parks his car, the dynamic sign at $3^{rd}$ Avenue and Main, as well as at other locations that include the available parking space, are changed to show one less parking space. Alternatively, if, for example, the parking space occupied by Sean is the last in a parking pool, the dynamic street sign may indicate that there is no longer parking available straight ahead, which includes parking spaces at or around $2^{nd}$ Avenue and Main.

Figure 5:
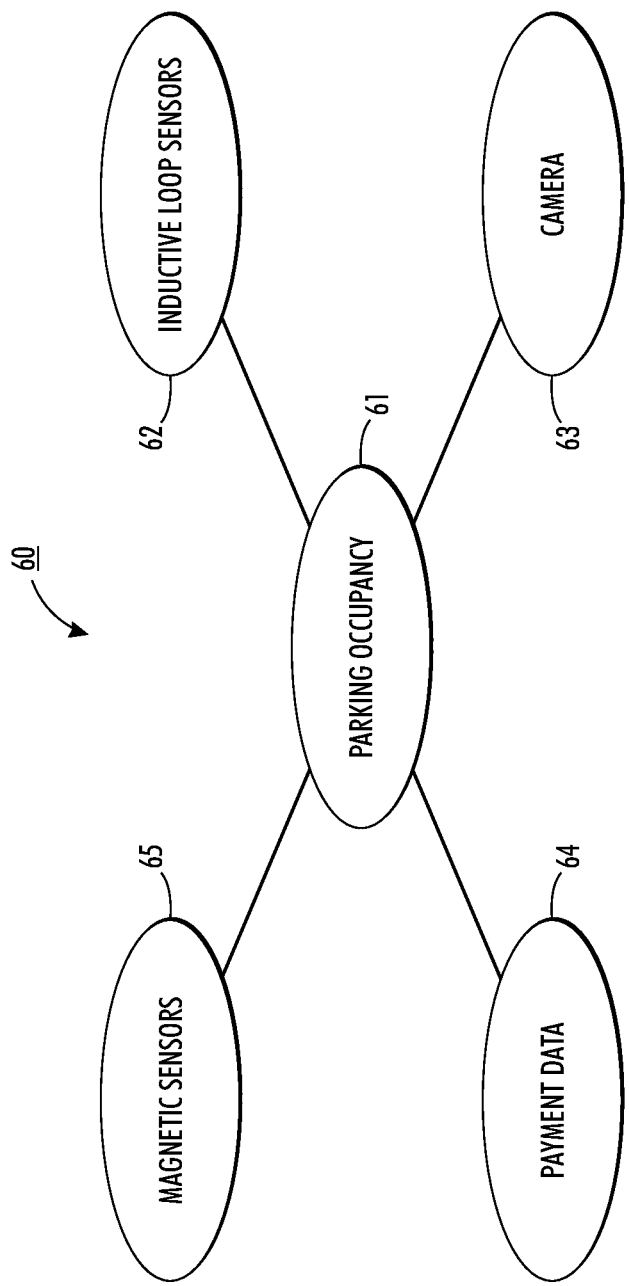
FIG. 5 is a functional block diagram showing, by way of example, tools for determining parking occupancy.
Figure 6:
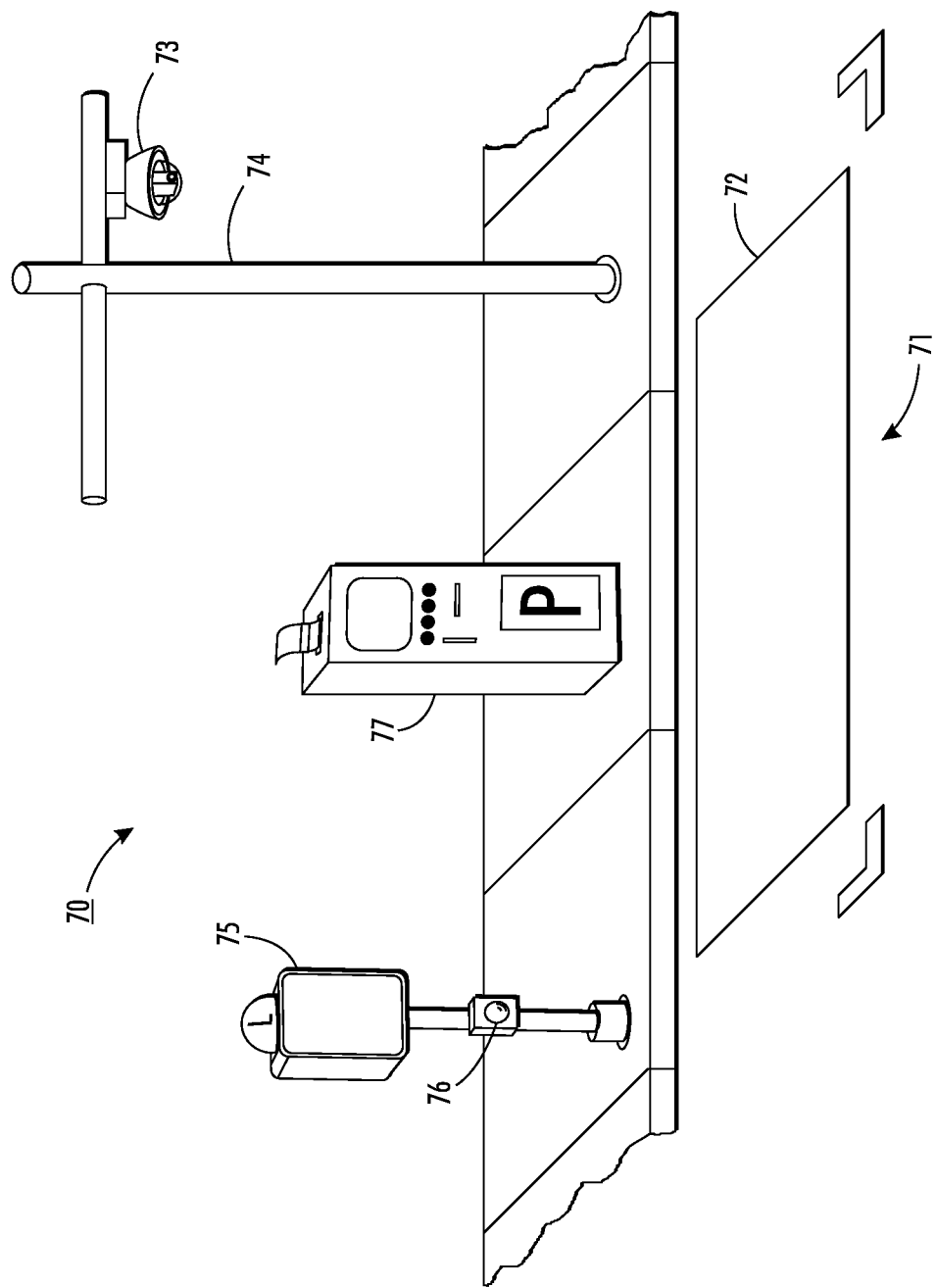
FIG. 6 is a functional block diagram showing, by way of example, an environment for determining parking occupancy via the tools of FIG. 5.

The available on-street parking can be determined based on an occupancy of one or more parking spaces. FIG. 5 is a functional block diagram showing, by way of example, tools for determining parking occupancy. Occupancy of a particular on-street parking space can be determined via one or more of inductive loop sensors 62, cameras 63, payment data 64, or magnetic sensors 65, as well as by other means for determining parking. A parking space is occupied when a car is parked in the space, when the space has been reserved, or when the space has received payment for a particular time. The parking space is available when the space is unoccupied and if parking regulations allow for parking at the time in question. FIG. 6 is a functional block diagram showing, by way of example, an environment for determining parking occupancy via the means of FIG. 5. To determine occupancy, each parking space 71 can include an inductive loop sensor 72 with wire coils that can be embedded into the street of the parking space 71. Each inductive loop sensor 72 determines occupancy, such as by detecting whether a car is parked in the corresponding parking space via inductance. Alternatively, cameras and magnetic sensors 73, 76 can each be used to watch one or more parking spaces and detect when each of the watched spaces is occupied by a car, truck, or other vehicle. The cameras and magnetic sensors 73, 76 can be positioned on a lamp post 74, on individual parking meters 75, or by multi-space parking meters to monitor one or more parking spaces. Combined use of the single and multi-parking meters can also be used to monitor the parking spaces and determine occupancy. For example, the multi-space parking meter 77 can be used to manage a parking pool, while the single-space parking meter 75 is used to manage one of the parking spaces in the pool during set days and times during which that parking space does not participate as part of the parking pool 12 and is instead used as an individually reservable or managed parking space. Outside of the set days and times, the single-space parking meter 75 either mirrors the group parking operations and parking indicators of the multi-space parking meter 77, or is inactive.

Payment data (not shown) for the parking spaces can also be used to determine occupancy. The payment data can be obtained from the individual 75 or multi-use parking meters 77 to identify which or how many parking spaces have been paid for in advance and in some cases, for how long the parking spaces will be occupied. For instance, a first parking meeting meter has received payment for two hours of parking, while a second parking meter has received no payment. Thus, the parking space associated with the second parking meter is determined to be available and can be displayed on the dynamic street sign.

In a further embodiment, occupancy factors can be applied to account for uncertainties, such as handicapped placards that allow for parking without payment, broken payment sensors, noisy or malfunctioning or vandalized occupancy sensors, or metered spaces that are illegally or otherwise occupied without payment, such as by delivery vehicles, which can be managed via just-in-time loading zone parking, as described in U.S. patent application Ser. No. 13/624,873, filed on Sep. 21, 2012. The factors can be used to adjust the number of available parking spaces determined via the parking data by, for example, an average ratio of unpaid occupied spaces to paid occupied spaces to provide a best estimate of available parking spaces. Other examples for considering the occupancy factors and uncertainties are possible. Logs of the parking spaces and corresponding payment data can be maintained in real-time or predetermined times, and stored. The payment data can be maintained individually by each parking meter or centrally, such as by the multi-space parking meter 77.

Figure 7:
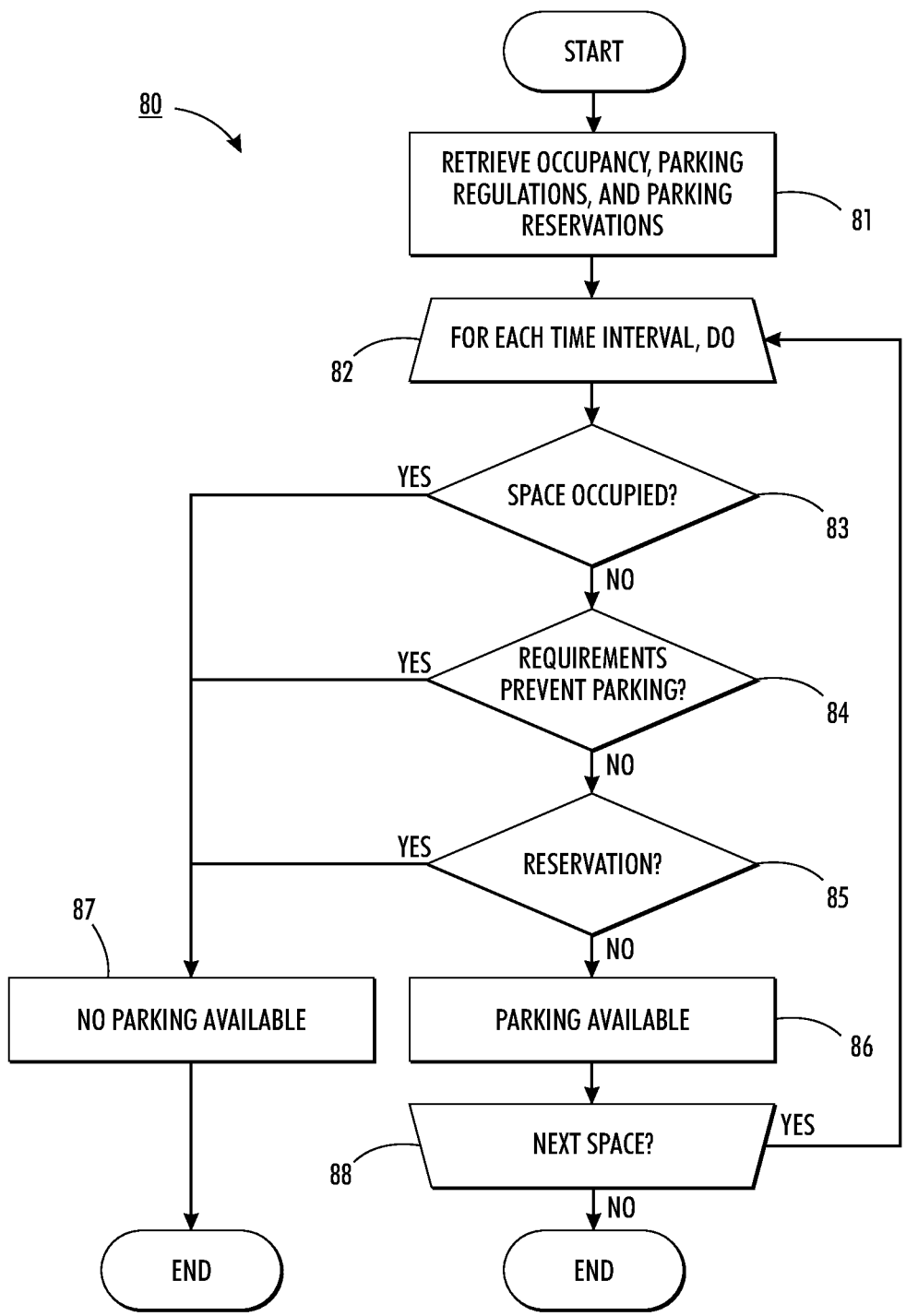
FIG. 7 is a flow diagram showing a routine for determining a number of available parking spaces for use in the method of FIG. 4.

Availability of a parking space can be based solely on a determination of occupancy or with consideration to other factors, such as any unfulfilled pending parking reservations and any applicable parking regulations, prohibitions and restrictions. FIG. 7 is a flow diagram showing a routine 80 for determining a number of available parking spaces for use in the method of FIG. 4. Availability can be determined for a set of one or more parking spaces in real-time, at predetermined times, or as needed to reflect changes in the status of parking spaces. The parking spaces in the set can be located within a particular distance from a dynamic street sign on which the availability is displayed. For instance, all available parking spaces or pools within a three block radius of the sign can be processed to determine availability. Other factors are possible for determining those parking spaces in the set, which will be processed for availability.

To determine the number of available parking spaces in the set, the parking services first retrieves the currently occupied parking spaces; parking regulations applicable to one or more parking spaces, which can include individual parking spaces, parking spaces within a desired parking pool, lot or garage, or a combination of individual parking spaces and group parking spaces; and parking reservations that overlap the time in which the dynamic sign is to display availability (block 81). Each of the parking spaces in the set are analyzed (block 82) to determine availability of that space. Using the occupancy data, such as described above with reference to FIG. 6, a determination (block 83) is made as to whether the parking space is occupied. If the space is occupied, the parking space is determined to be unavailable (block 87). However, if the space is not occupied, a determination is made as to whether any parking regulations prevent (block 84) a vehicle from parking in that space. If so, the space is determined to be unavailable (block 87), but if not, a further determination is made as to whether there is a pending reservation (block 85) for the parking space. If a reservation exists, the space is determined to be unavailable, while if no reservation exists, the parking space is determined to be available (block 86). Processing continues with the next parking space in the set (block 88), after which the routine returns. Application of the occupancy data, regulations, and reservations during the routine can occur in the same or a different order than provided in FIG. 7.

In yet a further embodiment, the number of available parking spaces is determined based upon optimistic or pessimistic parking resource utilization forecasts. For example, optimistic forecasts include predicting that some vehicles will leave before the end of their reserved parking period, which can be displayed as an available space on the dynamic street sign. Optimistic forecasts also include predicting that some motorists will not show up for their parking reservations and potentially leave their parking reservations unused. Other optimistic forecasts are possible.

In a still further embodiment, "minimal spacing intervals" are introduced before the parking space is determined to be available to avoid display of a space that is still occupied or otherwise unavailable, such as due to parking regulations. The sizes of the various intervals are set as policy parameters by the parking authorities and would typically be in the range of five to fifteen minutes. Such interval can include a minimal gap of time after a motorist leaves a parking space before the space is made available and displayed on the dynamic street sign. Other intervals are possible.

The availability of a number of parking spaces, once determined, can be updated by increasing the count of available spaces as previously-unavailable parking spaces become available. The parking spaces may become available due to a vehicle leaving the space, expiration of the maximum parking time allowed, ending of a regulated no-park time, and expiration of the fee paid for the space. Other factors are possible. Additionally, as previously-available parking spaces in the group become unavailable, the available parking count can be reduced. Display of the available parking spaces can be updated each time the parking spaces are updated, at predetermined times, or on an "as needed" basis.

Figure 8:
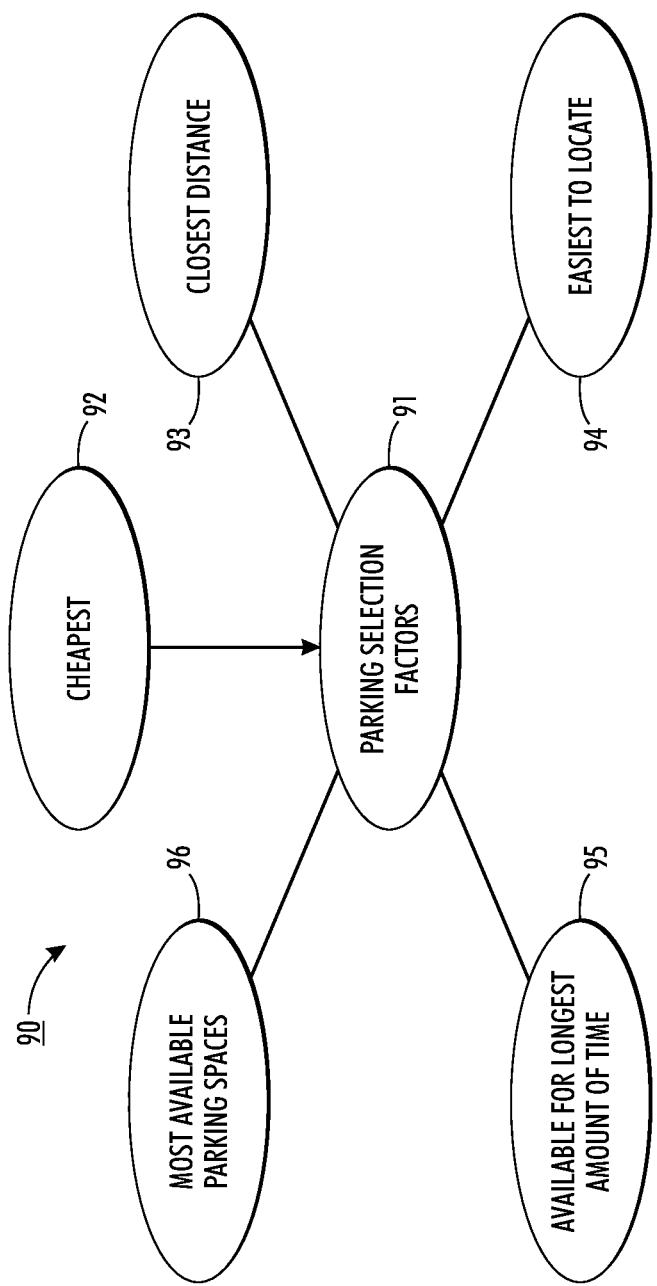
FIG. 8 is a block diagram showing, by way of example, parking selection factors.

The availability can be displayed on a dynamic street sign to direct users to the available parking spaces. Specifically, a location of the dynamic street sign is determined and one or more of the available parking spaces is displayed based on parking factors. FIG. 8 is a block diagram 90 showing, by way of example, parking selection factors 91. The parking selection factors 91 can include least costly available parking spaces 92, closest available parking spaces 93, easiest to locate available parking spaces 94, parking spaces available for the longest amount of time 95, and pools with the most available parking spaces 96. Other parking selection factors are possible, such as those factors that represent a motorist's best chance of finding a parking space. Further, more than one factor can be used to select the available parking spaces for display. The least costly 92 available parking spaces can be selected based on a total cost or cost per hour, as well as other cost determinations, which can be defined by maximum cost, minimum cost, or average cost. Those parking spaces that are least costly are selected. The number of selected parking spaces can be selected based on a predetermined number of spaces to display or a cost threshold, such as all spaces that are $3.00/hour or less.

The available parking spaces can also be selected for display based on a distance from the dynamic parking sign by selecting those available parking spaces closest to or furthest from the sign. Distance can be measured by block, feet or miles, as well as other measures of distance. The closest available spaces 93 can be determined via a distance threshold or an absolute number of parking spaces that are the closest or furthest. The easiest available parking spaces 94 can be determined using a location of the spaces. For instance, the available parking spaces on a main street are likely easier to find than on a neighborhood street or a less traveled street. Alternatively, the easiest available parking spaces to locate may be closest to the dynamic street sign, whereas the further available parking spaces are more difficult to locate. The parking spaces that are available for the longest amount of time 95 can be determined based on a time threshold, a maximum amount of time allowed, or an absolute number of spaces that have the longest available time. The amount of time can be measured based on a maximum amount of time, minimum amount of time, or an average amount of time of the available parking spaces. Also, available parking spaces can be selected based on location with reference to other available parking spaces. For instance, predetermined areas having the most available parking 96 can be selected and displayed.

Once selected for display, the available parking spaces can be updated to ensure that the dynamic street sign provides accurate information regarding available parking. As available parking spaces become unavailable, the number of available parking spaces displayed decreases, while the number of available parking spaces increases when previously unavailable parking spaces become available. Availability can be displayed on the dynamic street sign via an icon, a letter or words, a number of available parking spaces, or a direction arrow. Further, all available parking spaces in a particular area can be displayed or alternatively, only the best available parking spaces may be displayed. The best parking spaces can be determined based on parking characteristics, such as cost or distance.

Characteristics of the selected available parking spaces can be displayed to better assist drivers in locating available parking spaces that satisfy their needs.

Figure 9:
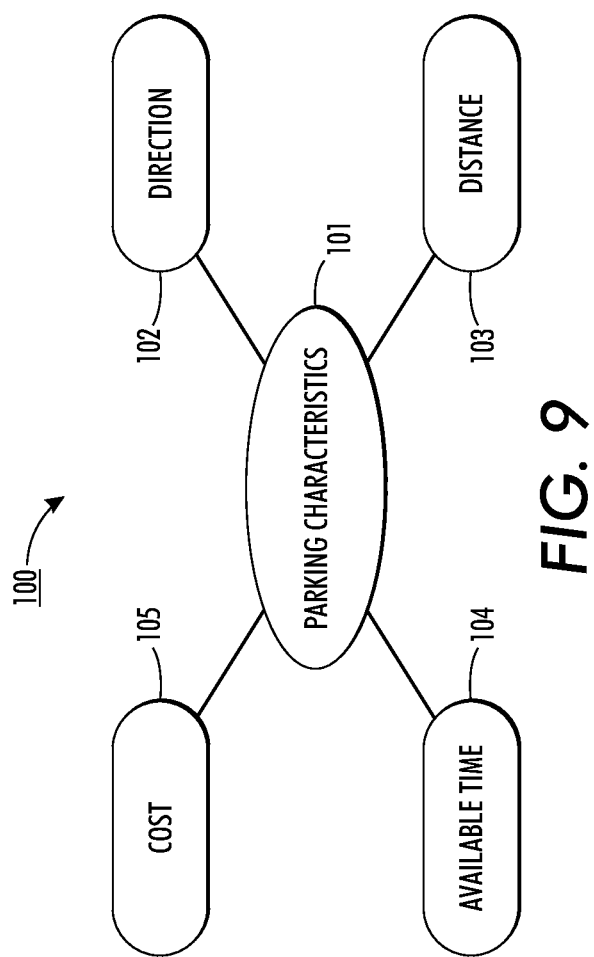
FIG. 9 is a block diagram showing, by way of example, parking characteristics.

FIG. 9 is a block diagram 100 showing, by way of example, parking characteristics. The parking characteristics 101 can include direction 102, distance 103, available duration 104, and cost 105 of the available parking spaces 102. The directions 102 can instruct a driver where to go to find available parking, such as to the right, straight, or left of the driver. In a further embodiment, the sign may indicate a direction behind the driver, such as when no other parking is available in the forward directions.

The distance 103 of the available parking spaces includes a measure of how far the available parking spaces are from the dynamic street sign on which the parking spaces are displayed. The distance measure can include blocks, feet, meters, or miles, as well as other distance measures. Alternatively, available parking spaces that are within a desired distance can be displayed, for example, via a distance arrow, whereas those available parking spaces outside the desired distance will not be displayed. The time for which parking spaces are available 104 can be measured for one or more spaces and can include an average of the available parking spaces, the maximum time available for the spaces, or the minimum time available for the spaces. Other measurements of time availability can be determined. Cost of the available parking spaces can also be displayed on the dynamic street sign and can be measured for one or more spaces using the average cost, the maximum cost, or the minimum cost. As well, the cost can be based on a total cost, such as for a particular amount of time, or per hour or other time measurement, such as days or minutes. Available parking spaces with the best, or cheapest, cost can be displayed, for example, via a direction arrow, whereas those parking spaces that are more expensive may not be displayed.

Figure 10:
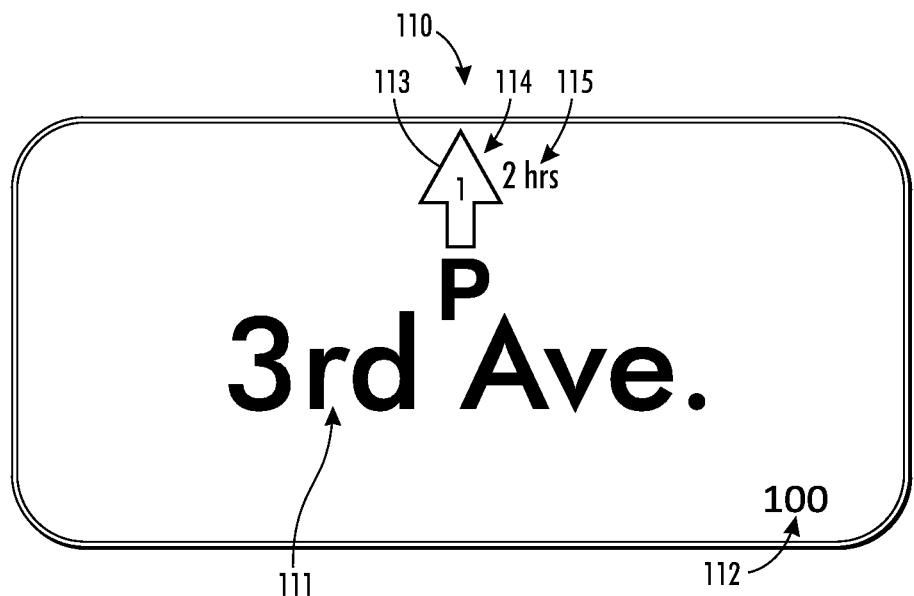
FIG. 10 is a block diagram showing, by way of example, a dynamic street sign displaying direction of available parking spaces.

One or more of the parking characteristics can be displayed on the dynamic street sign for assistance in directing the user to an appropriate available parking space. In one embodiment, a dynamic street sign may only include an indication of parking availability, such as by displaying an arrow in a direction which a motorist can follow to find the available parking. In a further embodiment, the dynamic street sign can include a street name, cross street, or block number, as well as characteristics of the available parking, such as distance or duration. FIG. 10 is a block diagram showing, by way of example, a dynamic street sign 110 displaying direction of available parking spaces. The dynamic street sign can either be aligned perpendicular to the street that the driver is on (when the driver is looking straight ahead and reading the sign), as shown in FIG. 2, or parallel to the street that the driver is on, as shown by the Main Street sign 14 in FIG. 1. In any orientation, the street sign can display location information, including one or more of the name of the street 111 to which the sign is parallel, the name of a cross street that intersects the street that the driver is on or the street to which the sign is parallel, a block number 112 of the street to which the sign is parallel, a block number of a cross street, and an indication of the direction of the indicated block number (to the right or left, for example).

Additionally, the dynamic street sign can display one or more of parking availability 114 via a letter "P" 116 or other icon, such as a car; a direction arrow 113; and a duration 115 of the available parking spaces to which the directions are provided. The letter "P" stands for parking and the direction arrow directs the driver to the available parking spaces. The direction of the arrow can point in a best direction to find parking, such as the parking that has the most available spaces, is the easiest to find, or is the cheapest. Other factors for determining the best direction are possible. If a direction arrow is used to indicate parking availability, the presence of the arrow can indicate parking, whereas an absence of the arrow can indicate no parking availability. However, in a further embodiment, when a dynamic street sign uses an availability icon, available parking is determined to exist if the availability icon is present on the dynamic street sign and the best direction to locate the parking can be provided via the direction arrow. However, if the icon is absent, no available parking exists.

Figure 11:
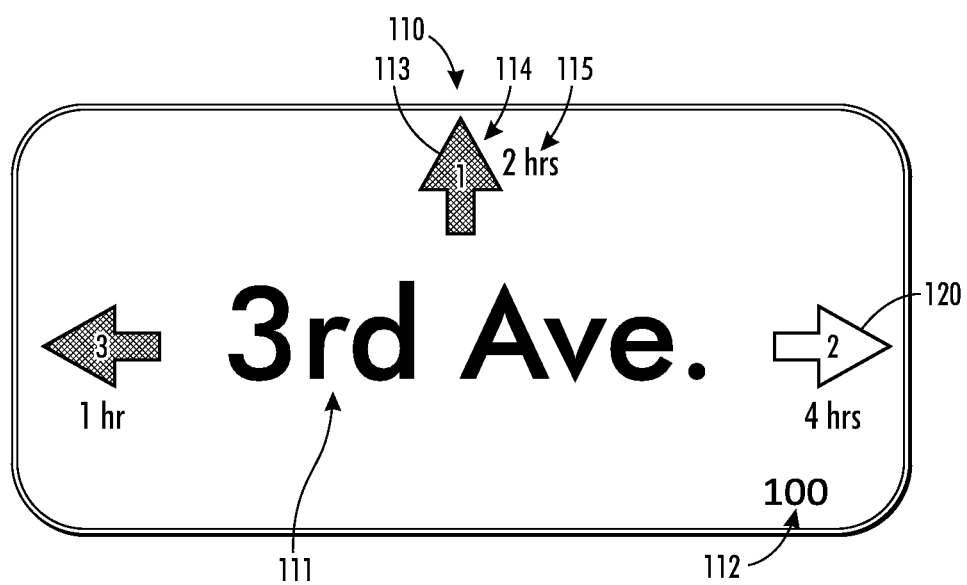
FIG. 11 is a block diagram showing, by way of example, a dynamic street sign of FIG. 10 displaying parking availability and parking characteristics, such as by color.

When parking exists, further information can be provided via the dynamic street sign. FIG. 11 is a block diagram showing, by way of example, a dynamic street sign 110 displaying parking availability 114 and parking characteristics, such as by color. The dynamic street sign can include a street name 111 that identifies the street to which the sign is parallel, as well as a block number 112 of the named street 111. The block number is displayed on a right side of the sign in this embodiment to indicate that the identified block is along the street to the right of the sign (from the perspective of a driver looking at the sign). Parking availability 114 can be displayed via one or more parking characteristics, such as a direction of the available spaces, distance, available parking duration, number of available spaces, and cost. Further, parking availability can be determined qualitatively, such as an indication of whether a set of parking spaces is empty, full, or somewhere in-between, or quantitatively by providing a percentage or number of available spaces. Other characteristics are available, including a number of available parking spaces.

Icons, such as an arrow 113 or other symbol, can be used to identify a direction 113 that a driver must follow to reach the available parking spaces. An arrow can be provided for each direction in which available parking spaces are located, such as straight, or to the left or right of the driver to guide the driver in reaching the available spaces. In a further embodiment, a single arrow may be displayed indicating the direction in which the driver has the best chance of finding a parking space, as described above with reference to FIG. 10, rather than displaying arrows for each direction that includes available parking. A distance of the available parking spaces from the dynamic street sign can be displayed within the arrow or other direction symbol. The distance can be measured in blocks, feet, meters, or miles, as well as other measures of distance.

A distance of the available parking spaces can also be displayed based on a color of the direction arrow, in addition to or in place of, the distance measure located within the arrow. A first color can indicate a short distance, while a second color can indicate a medium distance, and a third color can indicate a longer distance. The colors and distances can vary based on the municipality in which the dynamic street signs are displayed. For example, an arrow 113 pointing in one direction, such as up, can be colored green to indicate that the single parking space is located close by, such as one block. An up arrow can indicate parking in front of the motorist. A second arrow 120, such as pointing to the right, can be colored yellow to indicate the available parking spaces are considered to be a medium distance away, such as three or four blocks. Other colors, distances, and measures of distance are possible.

The direction icons 113, 120, including arrow icons, can also display a number of available parking spaces, in addition to or in place of the distance measure, to indicate the number of available spots in a particular direction. Further, a total number of parking spaces in one or more of the directions can be displayed to provide the driver with a full view of the parking, including available and unavailable parking in a particular direction or area. A duration of time 115 that the parking is available can also be displayed on the dynamic street sign 110. The duration 115 can include an average time for the available parking spaces in a particular direction, a maximum time for one or more of the available spaces, or a minimum time for one or more of the available spaces.

The dynamic street sign 110 can also display cost of the available parking spaces. The cost can be displayed via text or symbols. For example, the cost can be listed as a dollar or other currency amount, such as for a maximum time, minimum time, or average available time of all the parking spaces in a common direction. If used, the symbols can include a dollar sign or image of a denomination of U.S. currency, such as a dollar bill. An amount of the cost can be provided on the display using colors for the text or icons, which are representative of cost. For example, green can indicate less costly available parking, while red can indicate expensive parking. Additionally, no cost or "free" parking can be displayed as an icon with an "x" over the icon. Other displays for free parking are possible.

Providing the parking availability via the characteristics can be helpful to guide a driver in locating a parking space in a timely manner without obstructing traffic and causing frustration. For example, Elexa has an appointment at a salon on the 200 block of 3rd Avenue between Main Street and Central Street. The appointment will take about three hours. Elexa is driving along Main Street and approaches the intersection of 3rd Avenue and Main Street. The dynamic street sign of FIG. 11 assists Elexa in locating available parking by providing parking availability. While driving down Main Street, Elexa sees the sign and determines that there are parking spaces to her left, about three blocks away, with a 1 hour availability, parking spaces one block straight ahead with two hours availability, and parking spaces two blocks to the right with one or more spaces having four hours of availability. Central Street is located one block to the west of Main Street, which is to Elexa's left as she looks at the sign. Since Elexa's appointment will run about three hours, Elexa decides to take a right and locate one of the available parking spaces along 3rd Avenue. The sign immediately directs her to the optimum spots given her needed time for parking.

Figure 12:
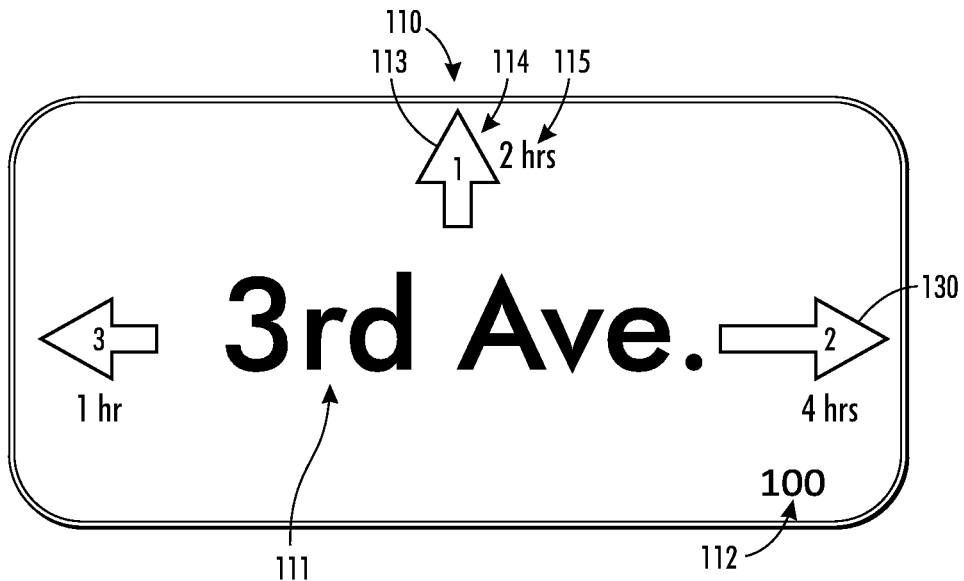
FIG. 12 is a block diagram showing, by way of example, the dynamic street sign of FIG. 10 displaying parking availability and parking characteristics, such as by icon size.

A distance of the available parking spaces can also be displayed based on a size of the icon or symbol that represents distance. FIG. 12 is a block diagram showing, by way of example, the dynamic street sign of FIG. 10 displaying parking availability and parking characteristics, such as by icon size 130. The dynamic street sign includes the street 111 that is parallel to the face of the sign, the block number 112 of the street 111, and parking availability 114 via the parking characteristics, such as direction 113, 130 and duration 115. Other street information is possible, such as the name of the street perpendicular to the sign (which in this example is the street on which the driver is located) or a block number of a street perpendicular to the sign. Additionally, a distance of one or more available parking spaces can be displayed based on a length of a direction icon 113, 130, such as an arrow. The longer the stem of the arrow, the further the available parking is located from the dynamic parking sign. Conversely, arrows with shorter stems indicate available parking that is more closely located to the dynamic parking sign.

Parking duration can be provided via icon size by increasing the size of an icon representing parking duration, such as an image of a parking meter, to indicate a long duration of available parking or decreasing the icon size to indicate a lesser duration of parking. A car icon or a letter "P" icons can represent available parking spaces and the size of the icon can represent an amount of the available spaces, such as a large icon for lots of available spaces and a small icon for less available parking. Cost information can also be provided based on icon size. For example, a small image of a dollar bill can indicate cheap parking, while a large image of the dollar bill can indicate expensive parking.

Figure 13:
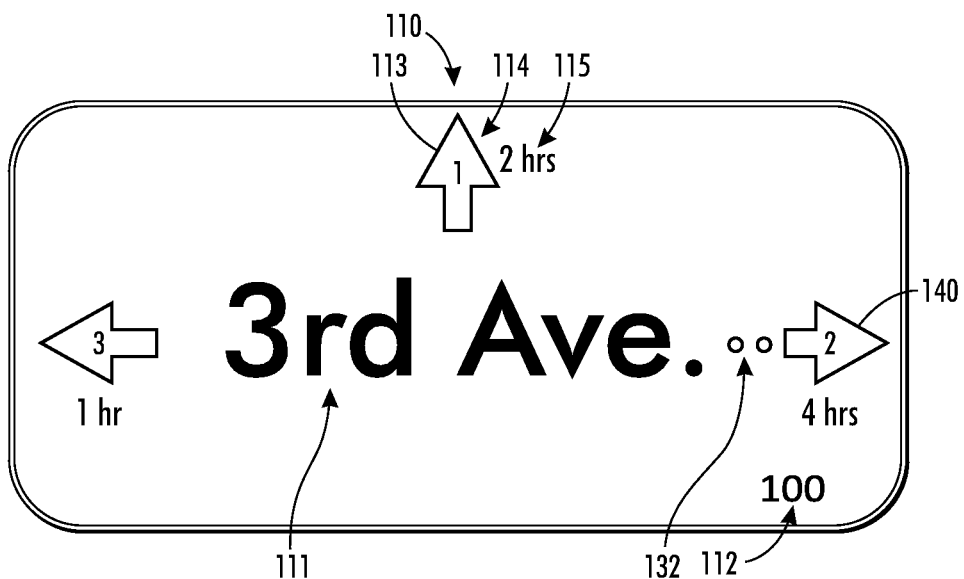
FIG. 13 is a block diagram showing, by way of example, the dynamic street sign of FIG. 10 displaying parking availability and parking characteristics, such as by number of icons.

Information regarding the parking characteristics can also be provided using a number of icons or icon segments displayed. FIG. 13 is a block diagram showing, by way of example, the dynamic street sign of FIG. 10 displaying parking availability and parking characteristics, such as by number of icons. The dynamic street sign 110 can display street names 111, block numbers 112, and parking characteristics, including a direction of available parking spaces 113, 140, a distance metric or number of available parking spaces within an icon displaying the distance metric, or a duration of the available parking 115. Metrics for one or more of the parking characteristics can be provided via a number of icons for that characteristic or based on a number of segments of a single icon. For example, distance of one or more available spaces can be provided on the display via a direction arrow. The stem of the arrow can include one or more segments 132 to indicate a distance of the available parking spaces. In one embodiment, each segment can represent a particular distance such as a block, meter, or mile. For example, a display of two segments can indicate that the available parking is two blocks, meters, or miles away from the dynamic street sign 110.

Further, information about or metrics for the parking characteristics can be provided via one or more icons. For example, an image of a single dollar bill can represent a cost of available parking and indicate less expensive parking, while an image of four dollar bills can indicate more expensive parking. A measure of distance can be represented by a number of arrows; parking duration can be represented by a number of parking meters; and a number of parking spaces can be represented by a particular number of vehicle icons. The metric for a particular parking characteristic in relation to the number of icons can correspond on a 1-to-1 basis or each icon can represent an increment of the particular parking characteristic, such as on a 10-to-1 basis.

Figure 14:
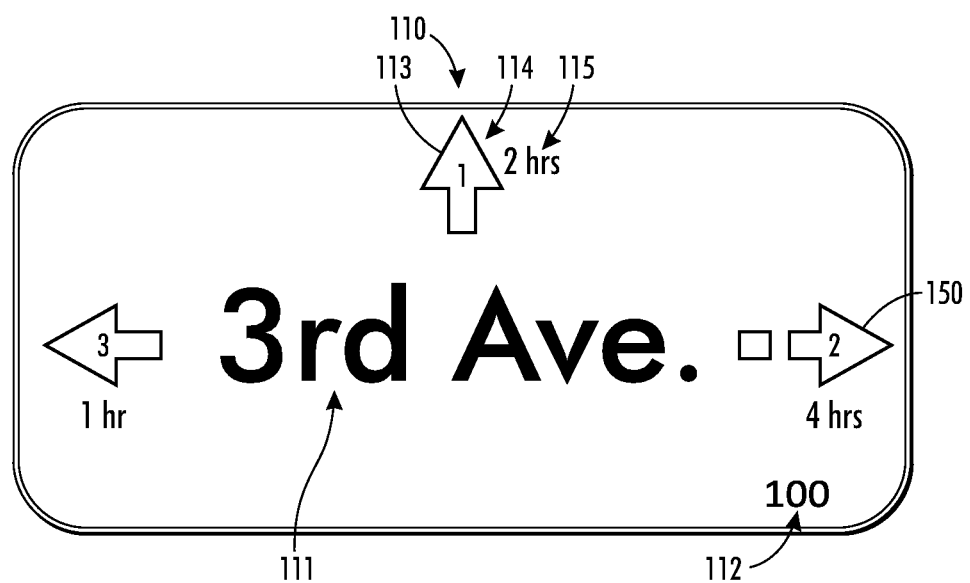
FIG. 14 is a block diagram showing, by way of example, the dynamic street sign of FIG. 10 displaying parking availability and parking characteristics, such as by flashing direction icons.

Parking characteristics can also be displayed via a flashing of the direction icon or other indication of parking availability. FIG. 14 is a block diagram showing, by way of example, the dynamic street sign of FIG. 10 displaying parking availability and parking characteristics, such as by flashing direction icons. As described in detail above with respect to FIG. 10, a dynamic street sign 110 can display a street 111 to which the sign is parallel, a block number 112 of the street 111, and parking availability, which is displayed via parking characteristics, such as a direction icon 113, 150, distance metric 114, and parking duration 115. The direction icon 150 can include an arrow or other icon. The icons 150 can flash colors, or on and off to provide an indication of the parking characteristics, including distance, recommendation for parking, or number of parking spaces available. Other parking characteristics indicated by the flashing direction icon are possible.

To provide information regarding a distance of the available parking spaces from the dynamic sign, the stem of the arrow icons can include a series of flashing segments based on a number of blocks or other distance metric by which the available parking spaces are located from the dynamic street sign 110. The segments are described above with reference to FIG. 13. The flashing can occur sequentially, segment by segment, or all segments can flash together. Additionally, the timing of an icon flashing can also provide information regarding distance of the available parking spaces. For example, when parking is close to the dynamic street sign 110, the direction icon 113 may flash faster, and the further away the parking availability is located, the slower the direction icon 113 flashes. In one embodiment, if the direction arrow does not flash, parking is determined to be available on the next block. In a further embodiment, the flashing can indicate a number of available parking spaces. In one example, no flashing can indicate no available spaces, while a slow flashing speed can indicate a low number of available spaces and fast flashing indicate a higher number of available spaces. In a further example, no flashing can indicate that more than two parking spaces are available, while flashing indicates that two or less spaces are available. Other examples are possible.

In a further embodiment, parking spaces that also serve as EV charging stations can be monitored and indicated on the dynamic street sign. The dynamic street sign can display whether parking spaces with EV charging stations are available, such as by displaying the letters "EV" adjacent to the direction arrow or by using an icon, such as a charging station.

In yet a further embodiment, display of the parking availability can occur via an LED display that switches between showing multiple streams of the parking characteristics. For example, a first display can show street names and parking direction, while a second display can show the street names and distance of the parking spaces, and a third display can show the street names, cost, and parking duration. Other numbers of displays and information provided on each display are possible.

In a still further embodiment, two or more signs can be used to direct a driver to available parking spaces. For instance, a driver sees a dynamic sign that has an arrow pointing to the right indicating that parking is available to the right. The driver takes a right and at the next block, the driver encounters a further sign, which displays an arrow to the left, indicating available parking. The driver takes a left and continues to follow the dynamic signs until he locates an available parking space.

While the invention has been particularly shown and described as referenced to the embodiments thereof, those skilled in the art will understand that the foregoing and other changes in form and detail may be made therein without departing from the spirit and scope of the invention.

What is claimed is:

1. A computer-implemented system for directing motorists to available parking spaces, comprising:
   an availability module to determine availability of a plurality of parking spaces;
   a location identification module to identify a street location of a dynamic parking sign comprising identifiers for at least one street at which the dynamic parking sign is located;
   a distance module to identify those parking spaces within a predefined distance of the dynamic parking sign;
   a direction determination module to determine for each of the available parking spaces that satisfy the predefined distance, a direction from the dynamic parking sign at the street location and to group the available parking spaces that satisfy the predefined distance by direction;
   a parking factor module to apply parking factors to the grouped available parking spaces and to select at least one of the groups of parking spaces that satisfy the parking factors; and
   a display module to display on the dynamic parking sign located at the street location, an availability of one or more of the parking spaces by providing the direction of the selected groups of parking spaces in relation to the street location.

2. A system according to claim 1, wherein the dynamic parking sign displays a duration that at least one of the parking spaces in the selected group is available.

3. A system according to claim 1, further comprising:
   a duration determination module to determine the duration based on one of a maximum amount of time available, a minimum amount of time available, and an average amount of time available for the available parking spaces.

4. A system according to claim 3, wherein the duration is displayed as at least one of a qualitative determination and a quantitative determination of an amount of available parking spaces for at least one of the directions.

5. A system according to claim 1, wherein the dynamic parking sign displays an indication of cost of the available parking spaces.

6. A system according to claim 5, further comprising:
   a cost determination module to determine the cost based on one of a maximum cost, a minimum cost, and an average cost of the available parking spaces.

7. A system according to claim 1, wherein the dynamic street sign displays at least two streams of parking information on the dynamic parking sign and each of the streams provides different information regarding the available parking spaces.

8. A system according to claim 1, wherein the dynamic street sign displays a distance of the available parking spaces from the dynamic street signs.

9. A system according to claim 8, further comprising:
   a distance determination module to determine the distance based on one of a maximum distance, a minimum distance, and an average distance of the available parking spaces.

10. A system according to claim 1, wherein the available spaces comprise one or more of on-street parking spaces, spaces in a parking lot, and spaces in a parking garage.

11. A system according to claim 1, wherein the available parking spaces for which the direction is displayed are selected based on one of a cost, availability, and location of the corresponding available parking spaces.

12. A system according to claim 1, wherein the dynamic parking sign displays an indication of whether one or more of the displayed available parking spaces is an EV charging station.

13. A computer-implemented method for directing motorists to available parking spaces, comprising:
   determining availability of a plurality of parking spaces;
   identifying a street location of a dynamic parking sign comprising identifiers for at least one street at which the dynamic parking sign is located;
   identifying those parking spaces within a predefined distance of the dynamic parking sign;
   determining for each of the available parking spaces that satisfy the predefined distance, a direction from the dynamic parking sign at the street location and grouping the available parking spaces that satisfy the predefined distance by direction;

applying parking factors to the grouped available parking spaces and selecting at least one of the groups of parking spaces that satisfy the parking factors; and displaying on the dynamic parking sign located at the street location, an availability of one or more of the parking spaces by providing the direction of the selected groups of parking spaces in relation to the street location.

14. A method according to claim 13, further comprising: displaying a duration that at least one of the parking spaces in the selected group is available.

15. A method according to claim 13, further comprising: determining the duration based on one of a maximum amount of time available, a minimum amount of time available, and an average amount of time available for the available parking s paces.

16. A method according to claim 13, further comprising: displaying at least one of a qualitative determination and a quantitative determination of an amount of available parking spaces for at least one of the directions.

17. A method according to claim 13, further comprising: displaying an indication of cost of the available parking spaces.

18. A method according to claim 17, further comprising: determining the cost based on one of a maximum cost, a minimum cost, and an average cost of the available parking spaces.

19. A method according to claim 13, further comprising: displaying at least two streams of parking information on the dynamic parking sign, wherein each of the streams provides different information regarding the available parking spaces.

20. A method according to claim 13, further comprising: displaying a distance of the available parking spaces from the dynamic street signs.

21. A method according to claim 20, further comprising: determining the distance based on one of a maximum distance, a minimum distance, and an average distance of the available parking spaces.

22. A method according to claim 13, wherein the available spaces comprise one or more of on-street parking spaces, spaces in a parking lot, and spaces in a parking garage.

23. A method according to claim 13, wherein the available parking spaces for which the direction is displayed are selected based on one of a cost, availability, and location of the corresponding available parking spaces.

24. A method according to claim 13, further comprising: displaying an indication of whether one or more of the displayed available parking spaces is an EV charging station.

* * * * *